US009357170B2

(12) United States Patent
Hsu

(10) Patent No.: US 9,357,170 B2
(45) Date of Patent: May 31, 2016

(54) DEVICE AND METHOD FOR MANAGING BANDWIDTH OF VIDEO CONFERENCE

(71) Applicant: HON HAI PRECISION INDUSTRY CO., LTD., New Taipei (TW)

(72) Inventor: Ming-Chung Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/810,136

(22) Filed: Jul. 27, 2015

(65) Prior Publication Data

US 2016/0080692 A1    Mar. 17, 2016

(30) Foreign Application Priority Data

Sep. 16, 2014  (TW) .............................. 103131990 A

(51) Int. Cl.
H04M 1/24    (2006.01)
H04N 7/15    (2006.01)
H04N 21/61   (2011.01)

(52) U.S. Cl.
CPC ............. *H04N 7/15* (2013.01); *H04N 21/6125* (2013.01); *H04N 21/6175* (2013.01)

(58) Field of Classification Search
USPC ............ 348/14.08, 14.09, 14.01, 14.1, 14.13, 348/14.12, 474, 516, 522, 575, 568; 379/93.21, 158, 202.01, 205.01, 379/114.07
See application file for complete search history.

(56) References Cited

U.S. PATENT DOCUMENTS 6,014,694 A * 1/2000 Aharoni ......... H04N 21/234381
370/232
2009/0052540 A1 * 2/2009 Gutman ........... H04N 21/23439
375/240.24

FOREIGN PATENT DOCUMENTS

CN    103248877 A    8/2013

* cited by examiner

*Primary Examiner* — Yosef K Laekemariam
(74) *Attorney, Agent, or Firm* — Novak Druce Connolly Bove + Quigg LLP

(57) ABSTRACT

In a method for managing video conference bandwidth, original video images with a predetermined quantity are acquired from a video sent from a client device. The video sent from the client device is compressed according to a default video compression parameter. The compressed video images corresponding to the original video images are acquired. A current network bandwidth is detected and compared with the data bandwidth of the compressed video. A video quality assessed value of the compressed video is calculated in event the current network bandwidth is larger than the data bandwidth of the compressed video. The default video compression parameter will be regulated and the video will be recompressed until the video quality assessed value of the compressed video is within the scope of predetermined quality requirement while the video quality assessed value of the compressed video is beyond the scope of a predetermined quality requirement.

16 Claims, 6 Drawing Sheets

DEVICE AND METHOD FOR MANAGING BANDWIDTH OF VIDEO CONFERENCE

CROSS-REFERENCE TO RELATED APPLICATIONS

This application claims priority to Taiwanese Patent Application No. 103131990 filed on Sep. 16, 2014, the contents of which are incorporated by reference herein.

FIELD

The subject matter herein generally relates to video conference.

BACKGROUND

In a meeting, a video conference system or a general video conference software controls the data bandwidth of a image in order to keep a video image a certain quality. The data bandwidth is also a bit rate of a compressed video image. Currently, there are mainly two mechanisms to manage the data bandwidth: one is to set a video stream bit rate a default, the other one is to detect in real-time a current network bandwidth and determine the video stream bit rate according to the current network bandwidth. For the first mechanism, because the data volume of the compressed video image is determined by the complexity of a current video image, setting the video stream bit rate to default may obtain an unclear compressed transmission image or waste the network bandwidth. For the second mechanism, the current network bandwidth is dynamically detected, so the bit rate of the compressed video image will be continually increasing with the current network bandwidth becoming broader, which necessarily wastes the network bandwidth while a low bit rate may ensure the transmission video image is clear.

BRIEF DESCRIPTION OF THE DRAWINGS

Implementations of the present technology will now be described, by way of example only, with reference to the attached figures, wherein.

DETAILED DESCRIPTION

Figure 1:
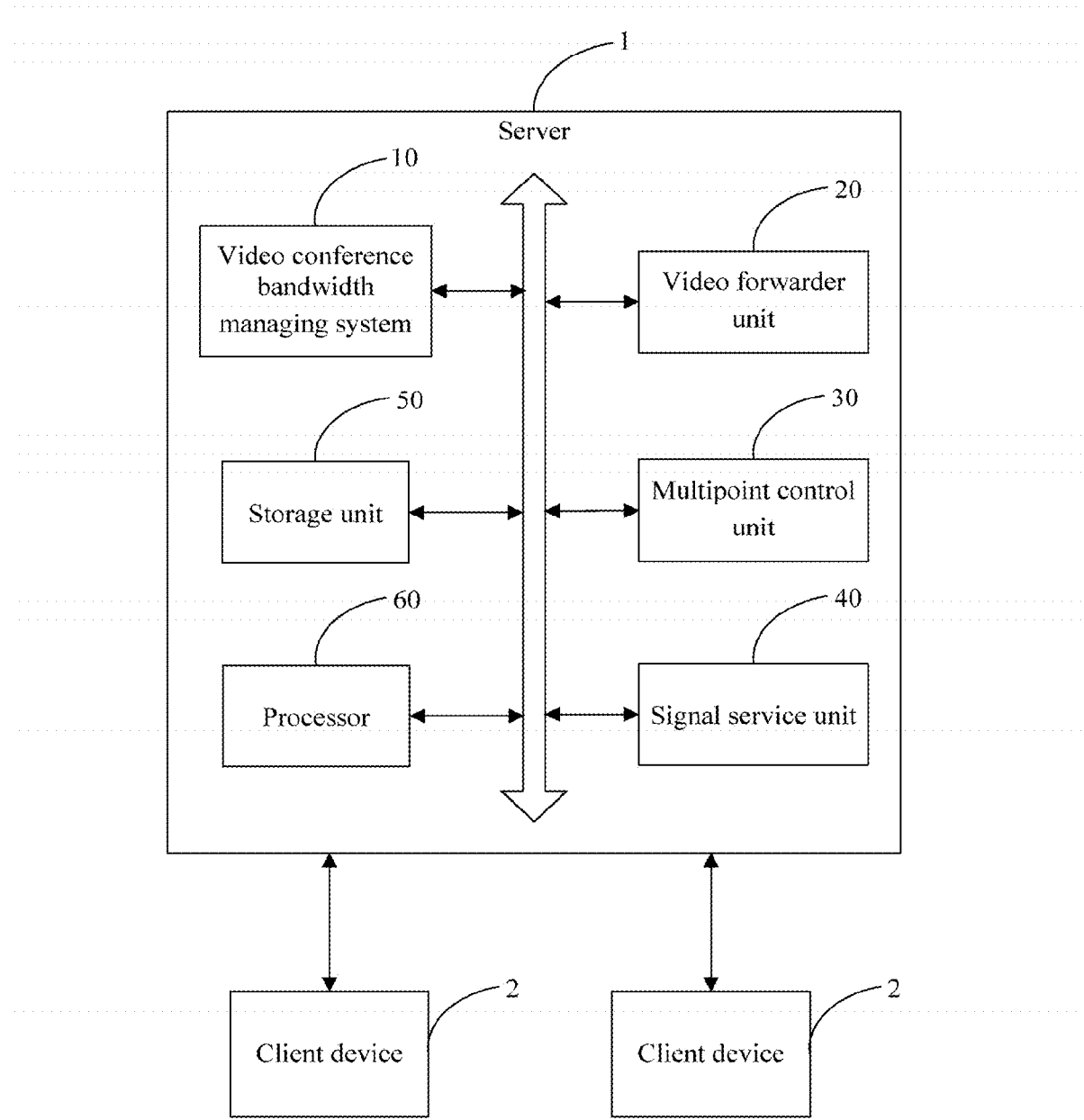
FIG. 1 illustrates a block diagram of an embodiment of a server including a video conference bandwidth managing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates a block diagram of an embodiment of a server. In the embodiment, the sever 1 includes a video conference bandwidth managing system 10, a video forwarder unit 20, a multipoint control unit 30, a signal service unit 40, a storage unit 50, and a processor 60. The sever 1 is connected to at least one client device 2 through a network to realize a video conference among multiple client devices. The video forwarder unit 20 connected by a data line or a signal line receives the video data sent by the client devices and forwards the video data to the multipoint control unit 30 or each client device 2. The multipoint control unit 30 compounds multi-channel video data forwarded by the video forwarder unit 20. The signal service unit 40 does a connection management for each client device 2, in detail, in a video conference the signal service unit 40 creates a connection and a communication process among these client devices after each client device 2 logs into the signal service unit 40.

Figure 2:
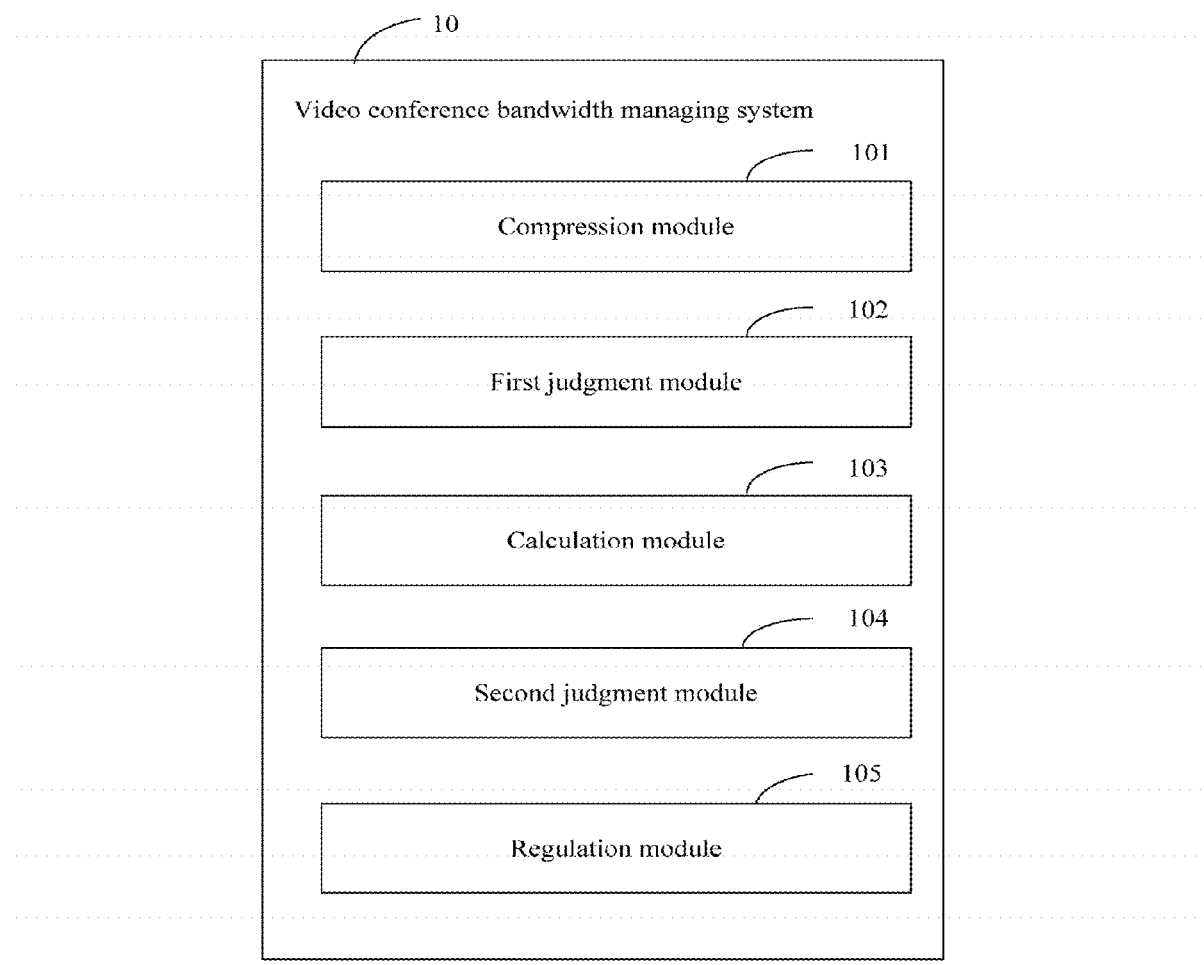
FIG. 2 illustrates a block diagram of an embodiment of function modules of the video conference bandwidth managing system in FIG. 1.

FIG. 2 illustrates in an embodiment, the video conference bandwidth managing system 10 includes a compression module 101, a first determining module 102, a calculation module 103, a second determining module 104, and an regulation module 105. The one or more function modules can include computerized code in the form of one or more programs that are stored in the storage unit 50, and executed by the processor 60 to provide functions of the video conference bandwidth managing system 10.

The compression module 101 acquires a predetermined quantity of original video images from a video sent from a client device 2, and compresses the video sent from the client device 2. In the field of digital communication, the data bandwidth of a digital video signal is very high and usually larger than 700 MB/s, so it is too hard for a computer to store and deal with the data bandwidth of a digital video signal. Using compression technology, the data bandwidth of the video can be decreased to 1-10 MB/s, so the video signal can be stored in the computer and do corresponding processing. In the embodiment, a method for compressing a video is not limited thereto. Furthermore, the number of the original video images with a predetermined quantity is manually set.

The first determining module 102 detects a current network bandwidth and determines whether the current network bandwidth is larger than the data bandwidth of the compressed video. The data bandwidth is also called bit rate. In the embodiment, the deference between the data bandwidth of the compressed video and the current network bandwidth may affect the data transmission effect. The data packet must be lost on condition that the data bandwidth of a transmission video is larger than the current network bandwidth, so a received video will be distorted.

The calculation module 103 calculates a video quality assessed value of the compressed video according to the original video images acquired and the compressed video images acquired in event the current network bandwidth is larger than the data bandwidth of the compressed video. The video quality assessed value is an average value of image quality assessed values of multiple video images, and reflects the quality of a compressed video. While the video quality assessed value is larger, the quality of the video is better, but the video quality assessed value can not be larger than 1.

The second determining module 104 determines whether the video quality assessed value of the compressed video calculated by the calculation module 103 is within the scope of predetermined quality requirement of the current video.

The regulation module 105 regulates a default video compression parameter and transmits the regulated compression parameter to the compression module 101 so that the video quality assessed value of the compressed video is within the scope of predetermined quality requirement while the video quality assessed value of the compressed video is beyond the scope of predetermined quality requirement.

Figure 4:
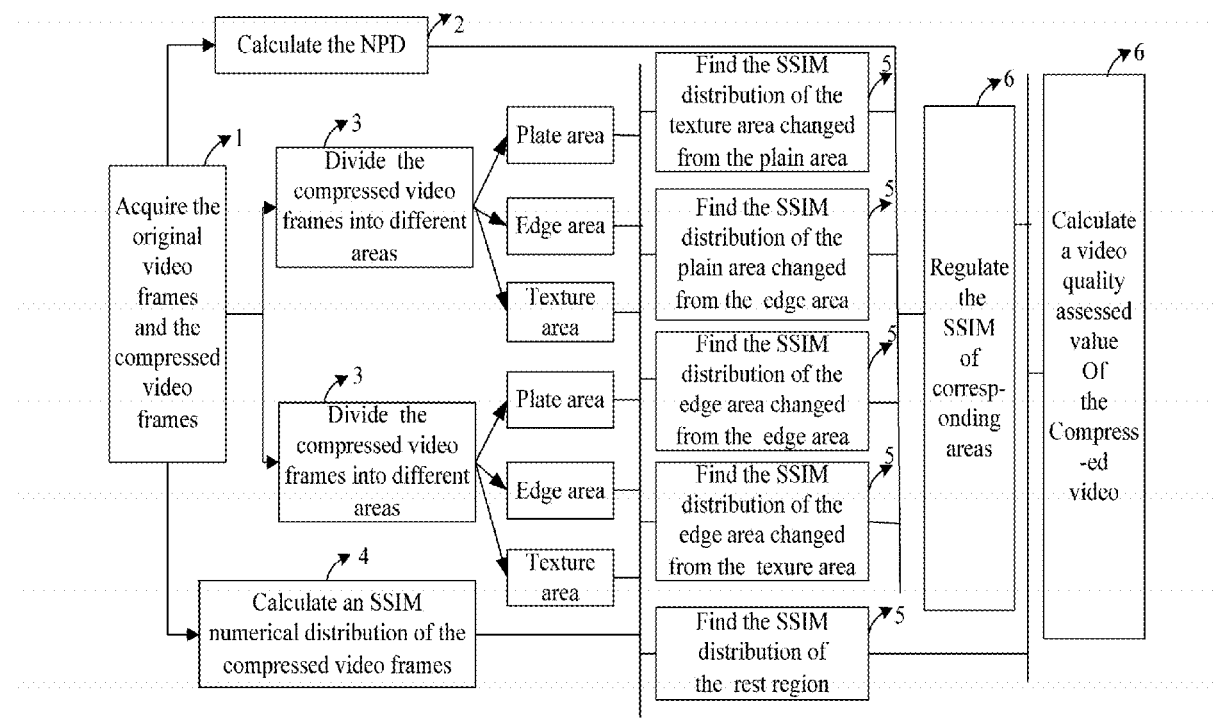
FIG. 4 illustrates a function introduction of an algorithm named JND-SSIM for creating the video conference bandwidth managing system in FIG. 1.

FIG. 4 illustrates a function introduction of an algorithm named JND-SSIM for creating the video conference bandwidth managing system 10. Structural similarity abbreviated to SSIM is a common image quality evaluation algorithm and evaluates the quality of a compressed image according to the luminance, contrast and structure of the image. Just-Noticeable Difference abbreviated to JND is a kind of statistical model in psychophysics research and reflects the minimum difference that can be perceived by eyes while receiving image information. In the research of human visual system, it has been discovered that a human has strong perception ability to a change of an edge area and a texture area of an image and has the highest sensitivity while the edge area or texture area of the image becomes a plain area.

FIG. 4 illustrates an introduction for the JND-SSIM algorithm. The illustration explains the JND-SSIM algorithm. First, the calculation module 103 of the video conference bandwidth managing system 10 acquires the original video images and the compressed video images; second, the calculation module 103 of the video conference bandwidth managing system 10 calculates the NPD according to a formula represented as $$NPD = \begin{cases} 0 & |ref(x,y) - dis(x,y)| \leq JND_{ref(x,y)} \\ \frac{|ref(x,y) - dis(x,y)|}{JND_{ref(x,y)}} & \text{other} \end{cases}$$

in the formula, the |ref(x, y)-dis(x, y)| represents the absolute difference between the pixel value of the original video images and the pixel value of the compressed video images, $JND_{ref(x,y)}$ is the JND value of the original video images and can be calculated by the available JND algorithm; third, the video conference bandwidth managing system 10 divides the original video images into a plate area, an edge area and a texture area and does a same action to the compressed video images; fourth, the video conference bandwidth managing system 10 calculates an SSIM numerical distribution of the compressed video images, herein, the SSIM numerical distribution corresponds to each pixel of the compressed video images; fifth, a block classification map can be defined in the way of defining the SSIM distribution of the texture area of the compressed video images changed from the plain area of the original video images as P2T area, the SSIM distribution of the plain area of the compressed video images changed from the edge area of the original video images as E2P area, the SSIM distribution of the edge area of the compressed video images changed from the edge area of the original video images as E2E area, the SSIM distribution of the plain area of the compressed video images changed from the texture area of the original video images as T2P area, the SSIM distribution of the rest region as R area, then finding these areas according to the contrast of the original video images and the compressed video images and the SSIM numerical distribution; sixth, regulating the SSIM of P2T area, E2P area, E2E area and T2P area according to the formulas below and calculating the JND-SSIM value, which is a image quality assessed value of each compressed video image in accordance with the regulated SSIM distribution of each area.

$$JND - SSIM = \frac{SSIM_{P2T} + SSIM_{E2P} + SSIM_{E2E} + SSIM_{T2P} + SSIM_R}{N_{P2T}W_{P2T} + N_{E2P}W_{E2P} + N_{E2E}W_{E2E} + N_{T2P}W_{T2P} + N_R W_R}$$

$$(W_{P2T} = 10, W_{E2P} = 30, W_{E2E} = 1, W_{T2P} = 30, W_R = 1);$$

$$SSIM_{P2T} = \sum_{x=1}^{M}\sum_{y=1}^{N} SSIM_{(x,y)} \cdot S_{P2T} \cdot W_{P2T};$$

$$SSIM_{E2P} = \sum_{x=1}^{M}\sum_{y=1}^{N} SSIM_{(x,y)} \cdot S_{E2P} \cdot W_{E2P};$$

$$SSIM_{E2E} = \sum_{x=1}^{M}\sum_{y=1}^{N} SSIM_{(x,y)} \cdot S_{E2E} \cdot W_{E2E};$$

$$SSIM_{T2P} = \sum_{x=1}^{M}\sum_{y=1}^{N} SSIM_{(x,y)} \cdot S_{T2P} \cdot W_{T2P};$$

$$SSIM_R = SSIM_{(x,y)} \ (x, y) \in \text{rest reigion};$$

$$S_{P2T} = 1;$$

$$S_{E2P}, S_{T2P} = \begin{cases} 1 & NPD = 0 \\ 0.6 & NPD \geq 1 \\ 0.45 & NPD \geq 1.5 \\ 0 & NPD \geq \end{cases};$$

$$S_{E2E} = \begin{cases} 1 & NPD < 3 \\ 0 & NPD \geq 3 \end{cases};$$

In the formula, the $N_{P2T}$, $N_{E2P}$, $N_{E2E}$, $N_{T2P}$ and $N_R$ respectively represents a pixel value of P2T area, a pixel value of E2P area, a pixel value of E2E area, a pixel value of T2P area and a pixel value of R area, the $SSIM_{P2T}$, $SSIM_{E2P}$, $SSIM_{E2E}$, $SSIM_{T2P}$ and $SSIM_R$ respectively represent an SSIM numerical distribution of a corresponding area, M and N respectively represent the dimension of each image, S and W are the regulation parameters of the corresponding areas, herein, the value of $W_{P2T}$, $W_{E2P}$, $W_{E2E}$, $W_{T2P}$ and $W_R$ are manual set. According to these formulas, the video conference bandwidth managing system 10 can quickly calculate an image quality assessed value in accordance with human physiological characteristics, then calculates the average value of the image quality assessed values of all the compressed video images to obtain the image quality assessed value of the compressed video.

Figure 5:
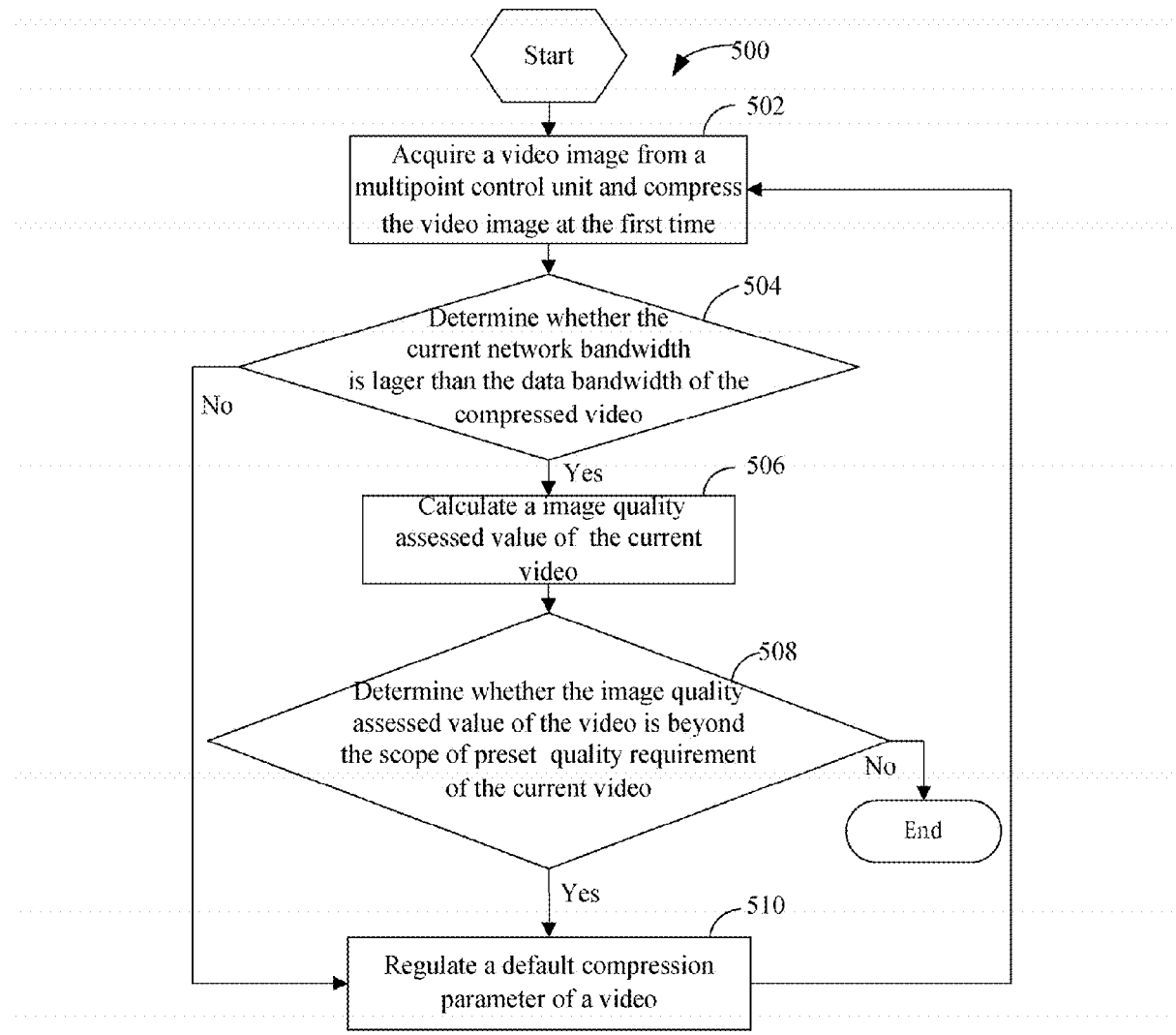
FIG. 5 illustrates a flowchart of an embodiment of a method for managing bandwidth of a video conference.

Referring to FIG. 5, a flowchart is presented in accordance with an example embodiment of a method 500 for managing the video conference bandwidth. The function modules 101-105 as FIG. 2 illustrates are executed by the processor 60 to realize the method. The method 500 is provided by way of example, as there are a variety of ways to carry out the method. The method 500 described below can be carried out using the configurations illustrated in FIG. 2, for example, and various elements of these figures are referenced in explaining the method 500. Each block shown in FIG. 5 represents one or more processes, methods, or subroutines, carried out in the exemplary method 500. Additionally, the illustrated order of blocks is by example only and the order of the blocks can change. The method 500 can begin at block 502.

At block 502, the compression module 101 acquires a predetermined quantity of original video images from a video sent from a client device 2, and compresses the video sent from the client device 2.

At block 504, the first determining module 102 detects a current network bandwidth and determines whether the current network bandwidth is larger than the data bandwidth of the compressed video. While the current network bandwidth is smaller than the data bandwidth of the compressed video, the regulation module 105 regulates a default video compression parameter, and the compression module 101 compresses the video according to a new parameter. The data bandwidth is also called bit rate. In the embodiment, the deference between the data bandwidth of the compressed video and the current network bandwidth may affect the data transmission effect. The data packet must be lost on condition that the data bandwidth of a transmission video is larger than the current network bandwidth, so a received video image will be distorted.

At block 506, the calculation module 103 calculates a video quality assessed value of the compressed video according to the original video images acquired and the compressed video images acquired in event the current network bandwidth is larger than the data bandwidth of the compressed video. The video quality assessed value is an average value of image quality assessed value of multiple video images, and the video quality assessed value reflects the quality of a compressed video. In the embodiment, an algorithm named JND-SSIM of the image quality assessed value is calculated according to a kind of algorithm combining the human visual characteristics.

At block 508, the second determining module 104 determines whether the video quality assessed value of the compressed video calculated by the calculation module 103 is within the scope of predetermined quality requirement of the current video. In the embodiment, once the calculated video quality assessed value is beyond the scope of predetermined quality requirement of the current video, it represents that the video quality of the compressed video can not meet the predetermined quality requirement.

At block 510, the regulation module 105 regulates a default video compression parameter, so a new parameter is obtained, then the video to be transmitted, will be compressed by the compression module 101 according to the new parameter to ensure that the data bandwidth of the video is regulated, so that the video quality assessed value of the compressed video can be within the scope of predetermined quality requirement while the video quality assessed value of the compressed video is beyond the scope of predetermined quality requirement.

Figure 6:
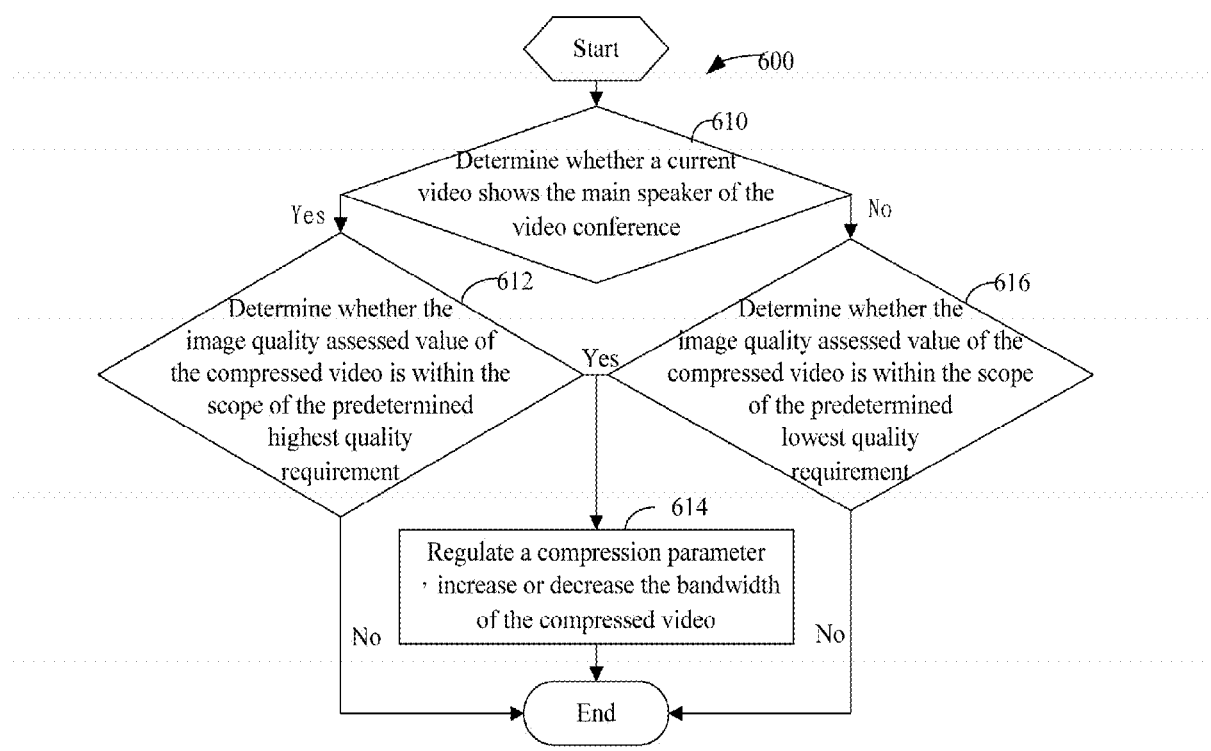
FIG. 6 illustrates a flowchart of an embodiment of a method to realize the block 506 and block 508 illustrated in FIG. 5.

Referring to FIG. 6, a flowchart is presented in accordance with an example embodiment of a method 600 to realize block 508 and block 510 as illustrated in FIG. 5. Each block shown in FIG. 6 represents one or more processes, methods, or subroutines, carried out in the exemplary method 600. Additionally, the illustrated order of blocks is by example only and the order of the blocks can change. The method 600 can begin at block 610.

At block 610, the second determining module 104 determines whether a current video image shows a main speaker of the video conference. In the embodiment, the image showing the main speaker of the video conference has a scope of predetermined high quality requirement, which is 0.92-0.98, besides, the image showing the secondary speaker of the video conference has a scope of predetermined low quality requirement, which is 0.7-0.8.

Figure 3:
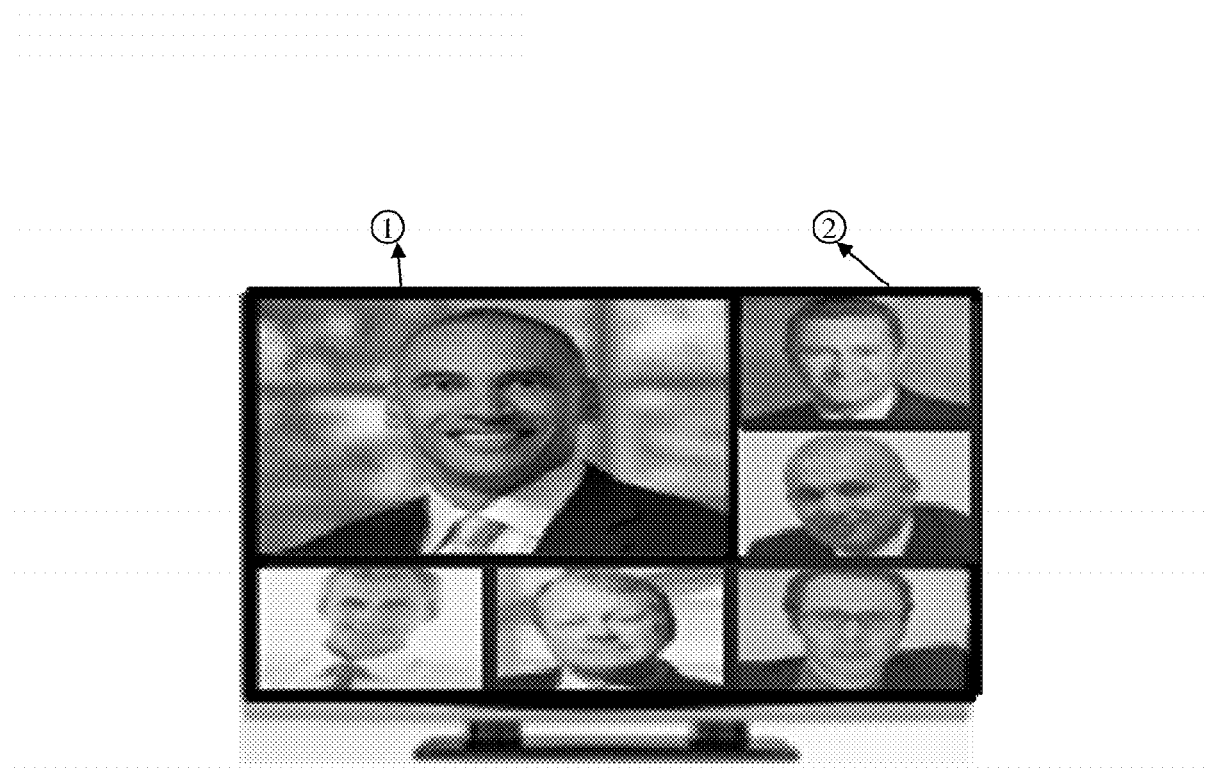
FIG. 3 illustrates a display image of a client device of a video conference.

At block 612, the second determining module 104 determines whether the video quality assessed value of the compressed video is within the scope of predetermined high quality requirement of the current video while a current image shows the main speaker of the video conference. In the embodiment, the high quality requirement represents that a user has a high requirement for the quality of the current video image to be displayed in video terminal. FIG. 3 illustrates, the image showing the main speaker of the video conference displayed in the video terminal calls for a higher requirement for the quality. Referring to FIG. 3, block ① shows the main speaker of the video conference.

At block 614, the regulation module 105 regulates a default video compression parameter and transmits the regulated compression parameter to the compression module 101. The compression module 101 compresses the transmission video according to a new compression parameter to ensure that the bandwidth of the compressed video is regulated so that the video quality assessed value of the compressed video is within the scope of predetermined quality requirement while the video quality assessed value of the compressed video is beyond the scope of predetermined quality requirement. In the embodiment, the compression parameter is regulated according to a fixed range, for example, 100 Kbps.

At block 616, the second determining module 104 determines whether the video quality assessed value of the compressed video is within the scope of a predetermined low quality requirement of the current video while a current image shows the secondary speaker of the video conference. In the embodiment, the low quality requirement represents that a user has a low requirement for the quality of the current video image. FIG. 3 illustrates the smaller split images are showing the secondary speaker of the video conference, so the smaller split images call for a lower requirement for the quality to be displayed in the video terminal. Referring to FIG. 3, block ② and other blocks in the same size of block ② show the secondary speaker of the video conference.

The embodiments shown and described above are only examples. Many details are often found in the art such as the other features of a device and method for managing bandwidth of video conference. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for managing bandwidth of a video conference for a server which is connected to at least one client device, the method comprising:
    acquiring a predetermined quantity of original video images from a video sent from the client device;
    compressing the video sent from the client device according to a default video compression parameter;
    obtaining compressed video images from the compressed video corresponding to the acquired original video images;
    detecting a current network bandwidth;
    comparing the current network bandwidth with a data bandwidth of the compressed video;
    calculating a video quality assessed value of the compressed video according to the acquired original video images and the compressed video images obtained in event the current network bandwidth is larger than the data bandwidth of the compressed video;
    determining whether the video quality assessed value of the compressed video is within a scope of predetermined quality requirement or not; and
    regulating the default video compression parameter to recompress the video until the video quality assessed value of the compressed video is within the scope of predetermined quality requirement while the video quality assessed value of the compressed video is beyond the scope of predetermined quality requirement.

2. The method as claimed in claim 1, wherein the step of regulating the default video compression parameter comprises:
    decreasing the default video compression parameter while the video quality assessed value of the compressed video is larger than the scope of predetermined quality requirement; and
    increasing the default video compression parameter while the video quality assessed value of compressed video is smaller than the scope of predetermined quality requirement.

3. The method as claimed in claim 1, wherein the scope of predetermined quality requirement comprises:
    a scope of high quality requirement and a scope of low quality requirement.

4. The method as claimed in claim 3, wherein the video conference comprises a main speaker and at least one secondary speaker, the step of determining whether the video quality assessed value of compressed video is within the scope of predetermined quality requirement comprises:
    determining whether a current video image of the compressed video shows the main speaker of the video conference;
    determining whether the video quality assessed value of the compressed video is within the scope of high quality requirement or not while the current video image of the compressed video shows the main speaker of the video conference.

5. The method as claimed in claim 4, wherein the step of regulating the default video compression parameter further comprises:
    decreasing the default video compression parameter while the video quality assessed value of the compressed video is larger than an upper limit value of the scope of high quality requirement; and
    increasing the default video compression parameter while the video quality assessed value of the compressed video is smaller than a lower limit value of the scope of high quality requirement.

6. The method as claimed in claim 4, wherein the step of determining whether the video quality assessed value of the compressed video is within the scope of predetermined quality requirement further comprises:
    determining whether the video quality assessed value of the compressed video is within the scope of low quality requirement or not while the current video image of the compressed video shows the secondary speaker of the conference.

7. The method as claimed in claim 6, wherein the step of regulating the default video compression parameter further comprises:
    decreasing the default video compression parameter while the video quality assessed value of the compressed video is larger than the upper limit value of the scope of low quality requirement; and
    increasing the default video compression parameter while the video quality assessed value of the compressed video is smaller than the lower limit value of the scope of low quality requirement.

8. The method as claimed in claim 1, wherein the video quality assessed value of the compressed video is an average value of image quality assessed values of the compressed video images with the predetermined quantity, and the image quality assessed values of the compressed video images with the predetermined quantity are obtained by comparing with the image quality assessed values of the original video images with the predetermined quantity.

9. A equipment for managing bandwidth of a video conference which is connected to at least one client device, comprising:
    at least one processor;
    a video forwarder unit;
    a multipoint control unit;
    a signal service unit;
    a storage unit; and
    one or more programs that are stored in the storage unit and executed by the at least one processor, the one or more programs comprising instructions for:
    acquiring a predetermined quantity of original video images from a video sent from the client device;
    compressing the video sent from the client device according to a default video compression parameter;
    acquire the compressed video images corresponding to the acquired original video images from the compressed video;
    detecting a current network bandwidth;
    comparing the current network bandwidth with a data bandwidth of the compressed video;
    calculating a video quality assessed value of the compressed video according to the acquired original video images and the compressed video images acquired in event the current network bandwidth is larger than the data bandwidth of the compressed video;
    determining whether the video quality assessed value of the compressed video is within a scope of predetermined quality requirement or not; and
    regulating the default video compression parameter to recompress the video until the video quality assessed value of the compressed video is within the scope of predetermined quality requirement while the video quality assessed value of the compressed video is beyond the scope of predetermined quality requirement.

10. The equipment as claimed in claim 9, wherein the step of regulating the default video compression parameter to recompress the video until the video quality assessed value of the compressed video is within the scope of predetermined quality requirement while the video quality assessed value of the compressed video is beyond the scope of predetermined quality requirement comprises:

decreasing the default video compression parameter while the video quality assessed value of the compressed video is larger than an upper limit value of the scope of predetermined quality requirement; and increasing the default video compression parameter while the video quality assessed value of the compressed video is smaller than a lower limit value of the scope of predetermined quality requirement.

11. The equipment as claimed in claim 9, wherein the scope of predetermined quality requirement comprises:

a scope of high quality requirement and a scope of low quality requirement.

12. The equipment as claimed in claim 11, wherein the video conference comprises a main speaker and at least one secondary speaker, the step of determining whether the video quality assessed value of the compressed video is within the scope of predetermined quality requirement or not comprises:

determining whether a current video image shows the main speaker of the video conference;

determining whether the video quality assessed value of the compressed video is within the scope of high quality requirement or not while the current video image shows the main speaker of the video conference.

13. The equipment as claimed in claim 12, wherein the step of regulating the default video compression parameter to recompress the video until the video quality assessed value of the compressed video is within the scope of predetermined quality requirement while the video quality assessed value of the compressed video is beyond the scope of predetermined quality requirement further comprises:

decreasing the default video compression parameter while the video quality assessed value of compressed video is larger than the upper limit value of the scope of high quality requirement; and increasing the default video compression parameter while the video quality assessed value of the compressed video is smaller than the lower limit value of the scope of high quality requirement.

14. The equipment as claimed in claim 12, wherein the step of determining whether the video quality assessed value of the compressed video is within the scope of predetermined quality requirement or not further comprises:

determining whether the video quality assessed value of the compressed video is within the scope of low quality requirement or not while the current video image shows the secondary speaker of the video conference.

15. The equipment as claimed in claim 14, wherein the step of regulating the default video compression parameter to recompress the video until the video quality assessed value of the compressed video is within the scope of predetermined quality requirement while the video quality assessed value of the compressed video is beyond the scope of predetermined quality requirement further comprises:

decreasing the default video compression parameter while the video quality assessed value of the compressed video is larger than the upper limit value of the scope of low quality requirement; and increasing the default video compression parameter while the video quality assessed value of the compressed video is smaller than the lower limit value of the scope of low quality requirement.

16. The equipment as claimed in claim 9, wherein a video quality assessed value of the compressed video is an average value of image quality assessed values of the compressed video images with the predetermined quantity, and the image quality assessed values of the compressed video images with the predetermined quantity are obtained through comparing to the image quality assessed values of the original video images with the predetermined quantity.

\* \* \* \* \*